United States Patent

[11] 3,573,770

[72] Inventor Kermit A. Norris
Azusa, Calif.
[21] Appl. No. 679,902
[22] Filed Nov. 1, 1967
[45] Patented Apr. 6, 1971
[73] Assignee Subscription Television, Inc.
New York, N.Y.
Continuation-in-part of application Ser. No. 592,458, Nov. 7, 1966, now Patent No. 3,518,648.

[54] SIGNAL SYNTHESIS PHASE MODULATION IN A HIGH BIT DENSITY SYSTEM
18 Claims, 10 Drawing Figs.

[52] U.S. Cl. .......... 340/174.1, 179/100.2
[51] Int. Cl. .......... G11b 5/06, G11b 5/44
[50] Field of Search .......... 340/174.1 (B), (G.H.); 346/74 (M); 179/100.2 (K)

[56] References Cited
UNITED STATES PATENTS

| | | | |
|---|---|---|---|
| 3,067,422 | 12/1962 | Hunt | 346/74 |
| 3,345,638 | 10/1967 | Christol | 346/74 |
| 3,356,934 | 12/1967 | Halfhill et al. | 340/174.1 |

*Primary Examiner*—Bernard Konick
*Assistant Examiner*—Vincent P. Canney
*Attorney*—Jackson and Jones

ABSTRACT: A method and apparatus for improving the packing density of digital data on a magnetic storage medium is disclosed which includes a source of digital signals, a format converter for converting the digital signals to a phase-modulated signal which is filtered and linearized for recording as a nonsaturated analog signal on a magnetic medium. A signal synthesizer included in the record channel, selectively contributes to the phase modulation by predistorting the signal to be recorded in order to compensate for phase distortions in the magnetic storage system. The signal to be recorded is an analog-alternating current signal varying above and below a zero reference line. The synthesizer circuit shifts the phase of the signal to be recorded predetermined amounts and directions such that upon reproduction the zero crossing points are properly separated with a crossing at each bit cell boundary for one binary value and a crossing at each bit cell boundary plus an additional zero crossing at the midbit cell period for the other binary value.

INVENTOR.
KERMIT A. NORRIS
BY
Christie, Parker & Hale
ATTORNEYS.

INVENTOR.
KERMIT A. NORRIS
BY
Christie, Parker & Hale
ATTORNEYS.

INVENTOR.
KERMIT A. NORRIS
BY Christie, Parker & Hale
ATTORNEYS.

SIGNAL SYNTHESIS PHASE MODULATION IN A HIGH BIT DENSITY SYSTEM

CROSS-REFERENCE TO RELATED APPLICATION

This application is a continuation-in-part of a U.S. Pat. entitled "High Density Record & Reproduce System" now issued as Pat. No. 3,518,648 issued on Jun. 30, 1970 by the same inventor and assigned to the same assignee as the present invention.

BACKGROUND OF THE INVENTION

In the above identified parent patent, a new and improved high bit density system is disclosed and claimed. In accordance with such a system typical digital data wherein the binary values are represented by discrete levels is converted by a format control into a phase-modulated digital signal which includes a timing reference and the binary data values in a single slowly varying analog signal which is recorded at a nonsaturating level on a conventional magnetic medium. In one embodiment, NRZ-C data is converted by leading and trailing edge detectors into a data-modulated signal referred to as a "split-phase-mark" signal (S$\phi$M) wherein a binary zero includes a transition at the beginning and end of every bit period, and a binary 1 is represented by such beginning and end transitions plus an additional midbit transition. A filter is employed to smooth the phase-modulated digital signal for recording in nonsaturated analog form on a magnetic surface. Biasing of the phase-modulated digital signal improves linearization of the signal prior to recording if necessary in accordance with the characteristic of the magnetic medium. Recovery of the data in the reproduce channel is provided by a differential phase shift keying system wherein the stored signal is recovered from the magnetic medium in analog form and passed through a filter. The filtered signal is hard-limited and is compared with a delayed version of itself after it has been subject to a delay of one-bit interval.

As described and claimed in the above identified patent this technique of data recovery eliminated a mandatory reliance on a clock or timing signal in the recovery channel as is typically required by all other known prior art systems. Although experiment and laboratory units claim to achieve a packing density of 10,000 bits per inch per track, such units are highly sensitive and are not practical for industry and spaced units. Furthermore, such units generally require a time-dependent form of peak detection or similar scheme on recovery, and such units cannot recover quickly enough at high packing densities to achieve reliable error rates. My invention is the first practical method and apparatus to achieve packing densities of 10,000 bits per inch with an error rate of less than one error in over $10^8$ bits of information processed by may novel method and apparatus.

I have discovered that the various reactive components in the magnetic storage and recovery system seriously phase distort the high frequency components of the modulated digital signal. As described above, hard-limit circuits are employed to convert the slowly varying analog signal recovered from the magnetic medium into the more conventional square wave shape generally associated with digital formats. These limit circuits, as is well known, have a threshold level which must be exceeded by the input signal in either a positive or a negative direction in order to yield either positive or negative square wave output signals. For example, a positive square wave output, therefor, requires at least two, zero crossings, with the first crossing of the threshold level of the limit circuit being in a negative-to-positive direction, and the second crossing being in a positive-to-negative direction. In the system of my invention, two successive 1's within two adjacent bit periods, require four limit level crossings; whereas, two successive 0's in two adjacent bit periods require only three limit level crossings. I have discovered that at the extremely high bit rates of my invention certain bit patterns become sufficiently distorted during the record and recovery process, that the limit level crossings associated with certain 1's are lost and do not occur, thus resulting in phase distortions of data delivered to the decoder apparatus of my invention.

In view of my unique decoding apparatus, however, the loss of such limit level crossings, or transitions, does not affect the absolute value of the digital data output and, therefore, their absence does not result in any dropout errors. The absence of such transitions, however, does cause a shift in the data waveforms at these various patterns; which shifts are objectional in computer applications because computer applications generally require the data format to consistently present one binary representing level for each assigned bit period. In accordance with the techniques of my invention of the present continuation-in-part application, I have compensated for the distortion by new and novel methods and apparatus wherein a signal synthesizing circuit is included in the record channel which circuit is selectively adjustable to phase modulate the data prior to its recording in a manner which predistorts the phase relationship for the offending binary patterns so as to compensate for the phase distortion inherent in the recording and rccovery system.

In practicing the method of my invention, an offending information pattern is recorded on the tape and recovered for reproduction on a time scale so as to ascertain the extent to which an offending transition is phase distorted outside of the range of the threshold limit level. Signals containing phase components having a corrective effect are derived by a signal synthesizer circuit. These corrective signals are echoes of the original signal which are phase shifted sufficient amounts and directions so as to correct for the phase distortion in the offending transition. In the practice of my method one circuit which has proved particularly advantageous is a signal synthesizer commonly referred to as a "transversal filter." Briefly, such a synthesizer is capable of selective adjustment to reproduce any desired phase and/or amplitude response that can be described in a Fourier sine series. In one embodiment the signal synthesizer is a digital shift register driven by a clock source and having weighted outputs which are selectively adjustable between the shift register stages. Each stage in the shift register is adapted to store a digital value indicative of one-half of a bit cell period. By employing several stages, more than one bit is stored and may be compared with adjacent bits so as to phase and/or amplitude compensate for those bit patterns which will be subjected to the most serious phase distortions by the system.

The various system parameters which contribute to phase distortions will be described in more detail hereinafter, but such distortions generally include phase changes of the signal as a function of thickness through the magnetic medium layer, phase variations in the filters, and phase variations introduced by capacitance including distributed capacitance in the amplifiers and record and reproduce heads. All such phase variations in a phase modulated signal, containing binary intelligence by phase differences from one bit period to the next, constitute error producing distortion unless compensated for by a signal synthesizer.

DESCRIPTION OF THE PRIOR ART

Both analog and digital recording techniques are known as is linearization of digital signals for analog recording. Previous prior art recorders rely on a timing reference either recorded on the magnetic medium and recovered, or derived at the reproduce channel, as an essential item in data recovery. No such timing reference is necessary in my invention and this fact serves to increase markedly the packing densities at superior error rates.

NRZ and RZ data in which one of two discrete levels represent binary values are known, as are binary data formats wherein the binary data is stored in phase changes from one bit cell to a next. Such NRZ or RZ data is phase modulated by a square wave clock, having at least 1 cycle per bit period, by leading and trailing edge detectors to obtain a data-modulated square wave including data and timing in a phase shift keying signal. Certain binary data patterns prior to recording are further phase modulated by a signal synthesizer to precompensate for phase distortions. The square wave signal is lowpass filtered prior to recording as an analog nonsaturating signal for the magnetic medium.

Preemphasizing circuits of the prior art are known and serve, in audio systems for example, to compensate for amplitude losses at selected frequency bands. Phase and amplitude equalization circuits are also known but tend to employ a plurality of tuned circuits which add additional phase distortions requiring further reactive networks to try to compensate for the total amount of phase distortion (both inherent in nature and purposely added by the designer) of the system. At high data rates such systems are not technically feasible nor commercially plausible.

BRIEF DESCRIPTION OF THE DRAWING

The foregoing and other objects and features of this invention may more readily be appreciated when taken in conjunction with the following description of the FIGS. in which.

DESCRIPTION OF THE PREFERRED EMBODIMENT

Turning now to the drawings, the system of FIGS. 1, 2 and 2A will be described wherein the bit densities and components under consideration render the system's phase distortion negligible for a large variety of applications. Thereafter the prerecord signal synthesizer system of FIGS. 3, 3A, 4 and 5 will be described.

Figure 1:
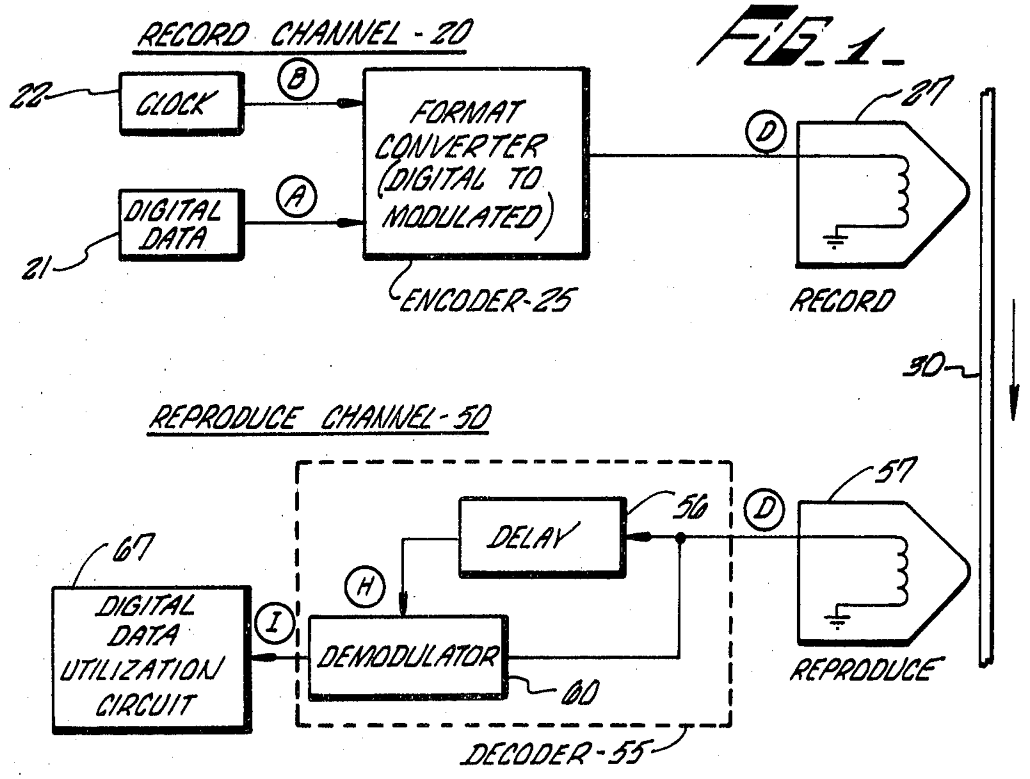
FIG. 1 is a block diagram of a high packing density record and reproduce system in accordance with the principles of this invention.
Figure 5:
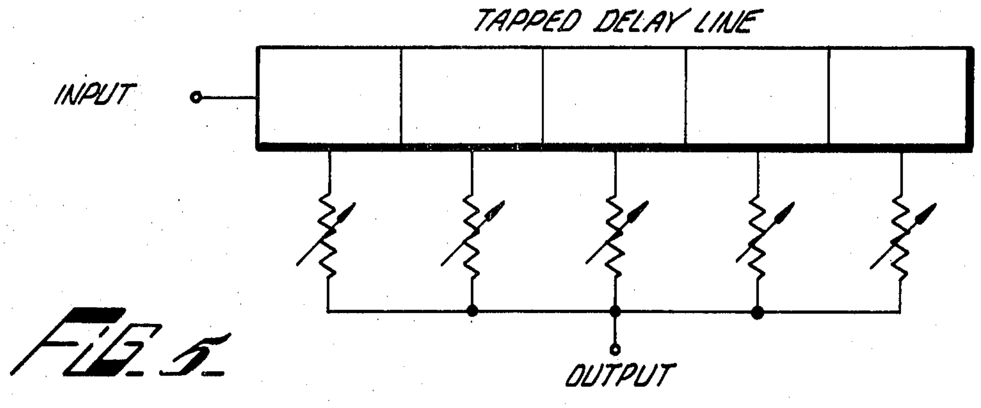
FIG. 5 is an alternative signal synthesizer circuit.

FIG. 1 depicts a record channel 20 and a reproduce channel 50 for respectively recording and reproducing data on a magnetic surface 30. This magnetic surface 30 may be any magnetic coating such as oxide coatings utilized on storage members including tape, drums, disc files or the like.

In accordance with the principles of this invention, a source 21 supplies digital data having at least two discrete levels. Such digital data may, for example, be nonreturn-to-zero data (NRZ) or return-to-zero (RZ data). data.) Thus, for purposes of example only, digital data from source 21 may be nonreturn-to-zero change (NRZ-C) format as shown in row 1 of FIG. 2A. In this digital format, data is represented by two distinct levels wherein a 1 is represented by one level and a 0 is represented by a second level, although the levels, of course, are selected arbitrarily relative to the binary values.

Figure 2:
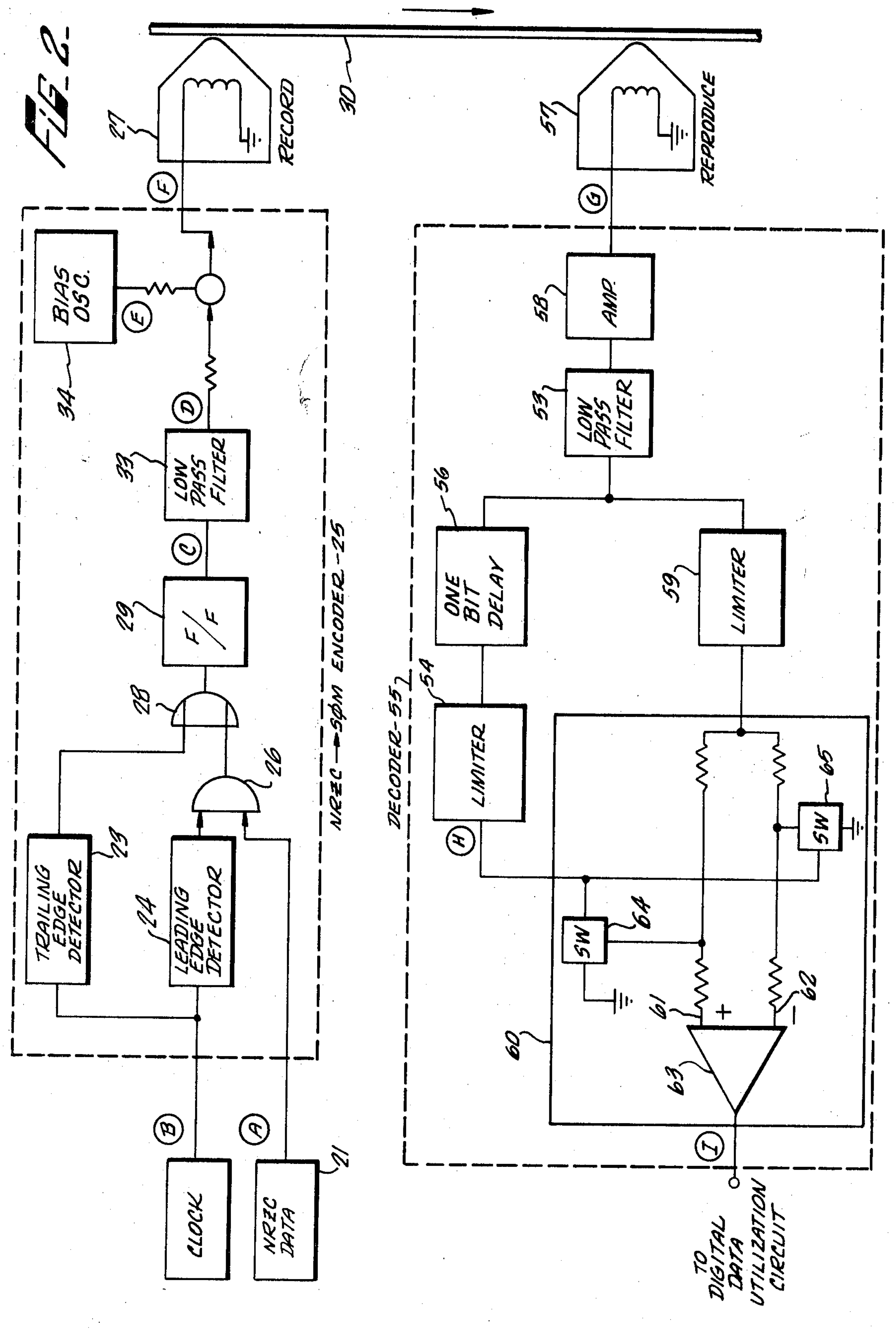
FIG. 2 is a combined block diagram and circuit schematic of the high packing density system of this invention.
Figure 2A:
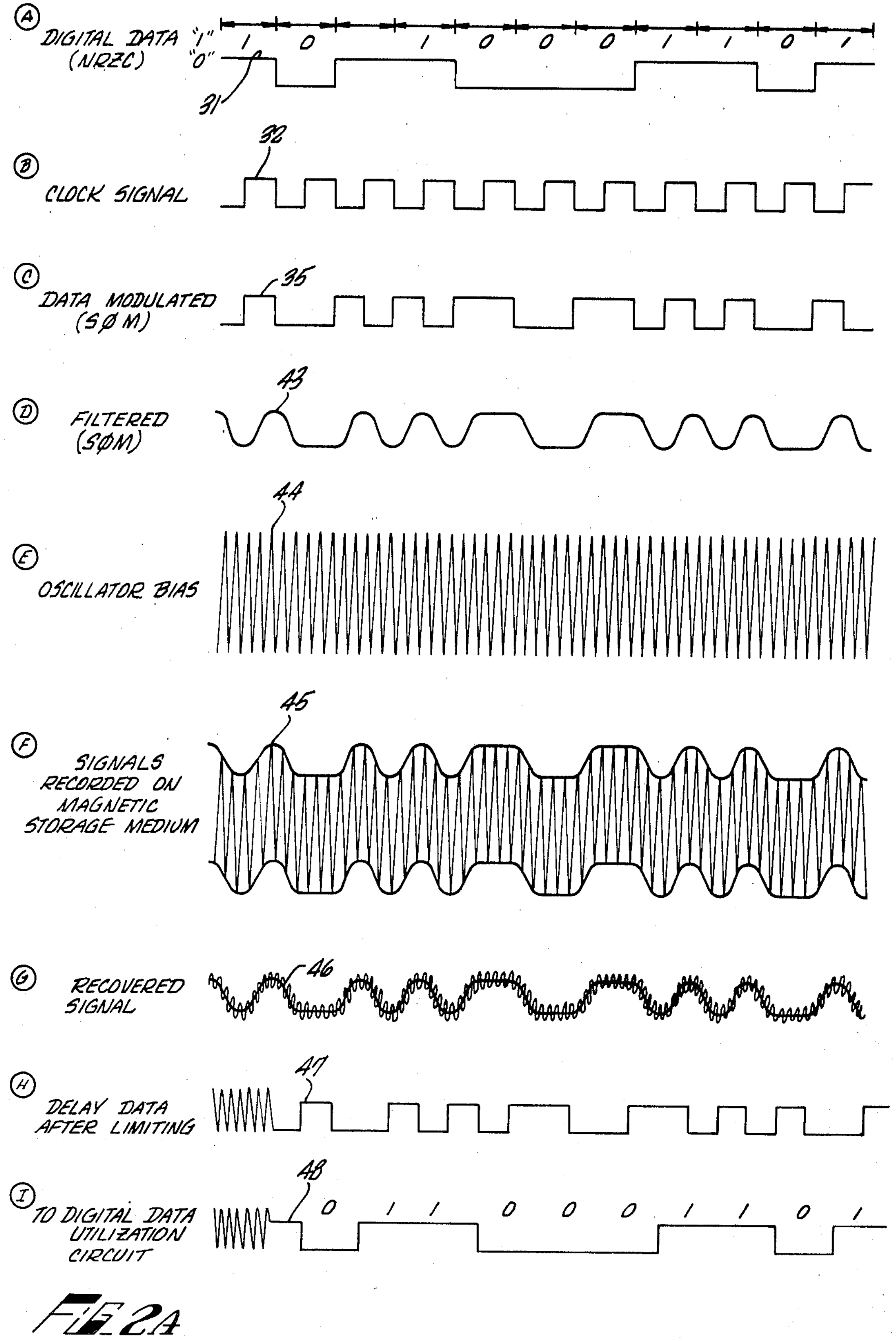
FIG. 2A is a chart of pulse and waveforms useful in promoting a clear understanding of FIG. 2.

In FIG. 2A pulse waveforms are identified by encircled letters. In FIG. 1 the waveforms of FIG. 2A are identified as to location by these encircled letters. Thus, NRZ-C data is emitted from source 21, FIG. 1, as shown by the encircled letter A.

A clock source 22 applies a train of pulses to the format converter, or encoder 25, which clock signal 32 is shown at B in FIG. 2A. It should be understood that a clock source such as clock source 22 is customarily available in all systems for recording digital data. In accordance with the principles of my invention, the clock signal 32 emitted by the clock source 22 serves as a carrier signal. This clock signal 32 has a frequency selected to make one complete cycle during a bit cell location. It may be any frequency within the system's available bandwidth. Current record and reproduce systems exhibit a bandwidth having a signal-to-noise ratio of approximately 30 decibels from 0 to 10,000 cycles per second per linear recording inch. This signal-to-noise ratio drops to approximately 18 or 20 decibels at a frequency of approximately 15,000 to 18,000 cycles per second per linear recording inch. The frequency of the clock signal 32 may vary for the circuit of FIG. 1 up to approximately 18,000 cycles per second per inch for current systems, although obviously this invention is not limited to such frequencies. The digital data pulse train 31 of source 21 serves as a modulating signal for the carrier signal represented by clock signal 32 of source 22. The output of format converter 25 is thus a digital data-modulated carrier signal shown at C in FIG. 2A as a data-modulated signal 35. This data-modulated signal 35 is referred to as a split-phase-mark (S$\phi$M) signal, in that a transition occurs at the beginning of every bit period; with a 1 represented by an additional midbit transition; and a 0 is represented by no midbit transition. Of course, other data-modulated signals may be utilized in my invention so long as the data (or binary intelligence), and timing are included in the signal. Other known phase signals include split-phase-change (S$\phi$C) and split-phase-space (S$\phi$S).

The data-modulated signal 35 of FIG. 2A is substantially a square wave but after filtering as will be explained in more detail hereinafter in connection with FIGS. 2 and 2A, such a square wave signal is recorded on the magnetic surface as a continuous phase-modulated wave as shown at D of FIG. 2A. The modulated signal 35, in FIG. 1, is recorded on a magnetic recording surface 30 by any conventional record transducer, or head 27. Typically record head 27 contacts or rides adjacent to a magnetic recording medium 30 and in response to signals applied thereto induces flux patterns on the magnetic surface. In my invention, no attempt is made to establish saturated flux reversals for 1's and 0's as is so common in the prior art. Rather, the record head 27 records signal 43 on magnetic surface 30 as a continually varying flux pattern in which the digital information is represented by flux variations corresponding to phase variations in signal 43.

Relative movement between magnetic surface 30 and a reproduce transducer, or head 57, converts the continually varying flux patterns on magnetic surface 30 back to a data-modulated signal.

It should be understood that the output waveform from reproduce head 57 contains the digital data in phase-modulated form, and it must be restored to a suitable digital data pulse pattern utilizing at least two discrete levels for binary data values so as to be readily available for conventional digital utilization circuitry.

Reliance on any exterior or derived clock train, or integration, rectification, or peak detection operations which exemplify the prior art, are avoided by my reproduce channel 50. The data-modulated signal 43 from a reproduce head 57 is applied to a decoder circuit 55 which includes a delay circuit 56 and a demodulator 60. It is well known that many precise and highly stable delay devices are currently available having wide ranges of delay. Any such conventional delay 56 may be employed. A delay of one bit cell interval has been chosen for purposes of illustrating my data recovery technique.

It should be noted that the phase-modulated data signal 35 is, of necessity, a random sequence, or pattern of 1's and 0's corresponding to the pattern of bits provided by the source of digital data 21. Inasmuch as the digital data is contained in modulated form in the phase-modulated signal 35, a delay of one bit cell in delay circuit 56, in essence, selects one data bit in delayed form as a basis for a phase comparison with the first digital bit to be ascertained. The phase of the delayed bit when compared with the phase of this first bit, provides a unique method for determining the digital value of the first bit. For example, if the phases of the delayed and first bit when compared are similar, then one discrete digital level and value is represented; whereas, if the phase of the delayed bit and the first bit to be ascertained are different, the other discrete digital level and value is indicated. The employment of this delayed signal thus provides a novel timing reference for recovering the data in the form of a differential phase detection technique.

Employment of delay circuit 56 and demodulator 60 restores the digital data-modulated signal 35 to its original digital form 31 without any recovery clock source and without utilizing any of the conventional recovery techniques such as differentiation or peak detection as used by the prior art. Such prior art techniques involve inherent speed and signal-to-noise limitations which heretofore has prevented the attainment of any packing densities above approximately 5,000 bits per inch under the most closely controlled laboratory conditions as reported by some costly and highly experimental units. I have attained by my invention, a commercially acceptable system which operates over wide ranges of temperature and without costly hand selection of components. In my system, a packing density as high as 30,000 bits per inch with reliability consistently better than one error in $10^6$ bits of data is readily attainable.

Reference to FIG. 2, which is a more detailed circuit schematic of the system of FIG. 1, readily depicts the simplicity of the components utilized in my invention. In FIG. 2, components which correspond to substantially the same components as FIG. 1 are designated by the same numbers. Thus, the format converter 25 is depicted as receiving two inputs which are the NRZ-C digital data signal 31 shown at A in FIG. 2A and the clock signal 32 shown at B in FIG. 2A. The format converter 25 includes a pair of detectors 23, 24 which receive the clock signal 32. The pair comprises a trailing edge detector circuit 23 and a leading edge detector circuit 24. These detector circuits are well known and may be any suitable detector circuits of the prior art. An AND gate 26 receives the output emitted from the leading edge detector 24 and also receives, as its other input, NRZ-C data 31 from input source 21. AND gate 26 delivers an output indication to an OR gate 28 when its input conditions from the leading edge detector 24 and the NRZ-C data source 21 are true. A second input to OR gate 28 is the output from the trailing edge detector 23. OR gate 28 triggers any standard flip-flop toggle circuit 29 so that one change of state of flip-flop 29 is generated for each input signal it receives from OR gate 28.

Reference to B of FIG. 2A discloses that the clocking signal 32 has a leading edge going positive at the center of each bit cell and it has a trailing edge going from a positive to a 0 or negative level at the end of each bit cell. Accordingly, the leading edge of clock signal 32 at the middle of the first bit cell is detected by circuit 24 and coincides with a positive level from the data source 21 at AND gate 26 to form a trigger input pulse for flip-flop 29. Flip-flop 29 changes state and produces the first pulse in the data-modulated split-phase-mark signal 35 as shown in C of FIG. 2A. The trailing edge detector 23 then detects the end of the bit cell and again pulses flip-flop 29 causing another change of state and presenting a negative level to the low-pass filter 33 during the second bit cell. This operation just described continues for the remaining 1's and 0's and the output from flip-flop toggle circuit 29 emits the split-phase-mark format format 35 shown at C in FIG. 2A.

Figure 6:
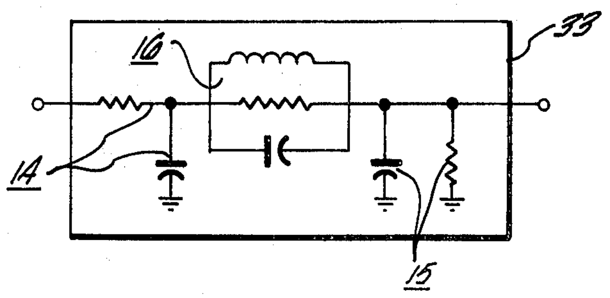
FIG. 6 is a circuit schematic of one suitable filter for FIGS. 2, 3 and 4.

The low-pass filter circuit 33 may be any suitable broad band low-pass filter circuit known in the prior art. One such suitable filter is depicted in FIG. 6 and comprises resistive and capacitive input and output sections 14 and 15 interconnected by a parallel ladder branch section 16. The branch section comprises an inductor, a resistor and a capacitor. The filtered and smoothed output signal 43 from filter 33 is shown at D in FIG. 2A.

The filtered data signal 43 may be stored directly on an exceptionally thin magnetic surface 30 such as is typically found on high precision magnetic memory discs. I have found, additional reliability and error free recording is available by summing filtered signal 43 with a suitable high frequency bias signal 44 (E, FIG. 2A) as emitted by a bias oscillator 34. The frequency for the output of bias oscillator 34 may conveniently be several times the frequency and amplitude of the clock signal 32. For example, the oscillator bias signal 44 may be selected at a frequency that is five times greater than the frequency of the data signal 43.

This bias oscillator signal 44 linearizes, upon recording, the filtered split-phase-mark data signal 43, and thus tends to eliminate any harmonics which may be present in the low frequency data components. These harmonics at some bit densities within the wide capabilities of this invention may interfere with the higher frequency data at such bit densities and could be mistaken by the demodulator as data. The use of the bias oscillator alone, or together with filter 33 as required, aids in providing substantially error-free recovery of digital data over a wide range of bit densities.

As one example, the low-pass filter circuit 33 may be utilized at packing densities such as 10,000 bits per inch. At such a packing density, filter 33 passes all frequencies below the bit rate which would in this instance be 10,000 cycles per second per inch for clock signal 32. Selecting the low-pass filter with this range of low-pass frequencies eliminates the fifth harmonic from the input signal so that it does not interfere with the bias frequency of oscillator 34 which in the example just given would have an oscillating frequency at 50,000 cycles per second. As another example, highly satisfactory operation has been achieved at rates as high as 50,000 bits per second at a tape speed of 2½inches per second, or a packing density of 20,000 bits per linear inch. For this example the oscillator bias may be set at 500,000 cycles per second. The low-pass filter 33 is not necessary for this application, and the nonfiltered split-phase-mark digital data signal 35 may be summed directly with the oscillator bias signal 44.

Head 27 applies a phase-modulated envelope 45 to the magnetic surface 30. Although tests have not proved conclusively what flux patterns exist on the magnetic surface, it is believed that the high frequency bias of envelope 45 may erase itself once it has been stored on the magnetic surface 30. This erasure is accomplished by what is believed to be self-demagnetization of the flux reversals induced at the magnetic surface 30. The resulting flux pattern which is present on magnetic surface 30 between the record and the reproduce operations is a continually varying residual or remnant flux pattern approximately as depicted by the filtered data-modulated signal 43, FIG. 2A.

During reproduce operations, this continuously varying residual flux pattern induces a signal 46 into the reproduce head 57 which signal includes some high frequency noise. This output signal 46, as recovered, is shown at G in FIG. 2A. Recovered signal 46 is amplified by any suitable reproduce amplifier 58 as known in the art, and is passed through a low-pass filter 53 of the type described hereinbefore in order to remove the noise components. Limiter circuit 59 squares the the filtered signal into its original split-phase-mark form 35 such as shown in C of FIG. 2A. A one-bit delay circuit 56 delays the filtered signal 46 which delayed signal is also limited by a limiter circuit 60 and in its delayed and limited form 47 (H of FIG. 2A) is presented to a demodulator 60. Demodulator 60 may be any suitable demodulator such as a double-balanced-demodulator or an exclusive NOR circuit.

In FIG. 2, a double balanced demodulator 60 of conventional form is shown comprising a differential amplifier 63 having standard resistive inputs to a plus and negative input side thereof. The recovered data-modulated signal (substantially signal 35 of row C, FIG. 2A) is applied to the input terminal 61 and 62 of the differential amplifier 63. The delayed data signal 47 (row H of FIG. 2A) is applied by limiter 54 to a pair of switches 64, 65, of any well-known type which respond to opposite polarity signals for alternately completing a circuit-to-ground for terminals 61 and 62. These switches 64, 65 are on a mutually exclusive basis and only one switch is closed at any one instant. The following table describes a demodulating operation based upon a positive or negative level for the two input signals (substantially 35 and signal 47 of FIG. 2A) as applied to demodulator 60:

TABLE I

| | | | | |
|---|---|---|---|---|
| Recovered SΦM Signal | Positive | Positive | Negative | Negative. |
| Delayed SΦM Signal | do | Negative | do | Positive. |
| Output Signal From Demodulator 60. | do | do | Positive | Negative. |

As shown in table 1, a negative polarity signal emitted by limiter 54, together with a negative input to amplifier 63 from limiter circuit 59 results in a positive output signal which is the first pulse of signal train 48 shown in I of FIG. 2A. The negative polarity signal from limiter 54 closes switch 64 and shorts the positive side of amplifier 63 to ground. Thus, the negative polarity signal from limiter 59 is applied to the negative terminal 62 of amplifier 63 and in standard differential amplifier operation a positive signal is emitted by amplifier 63. Switches 64 and 65 continue to operate under control and in accordance with the polarity of the signal emitted by limiter circuit 54. Differential amplifier 63, in accordance with the polarity of the input signal emitted from limiter circuit 59, responds to its grounded input conditions by emitting signal 48, FIG. 2A.

In the foregoing operation, it was assumed that the signals in passing through the low-pass filters, the amplifiers, the record and reproduce heads and the magnetic medium as well, did not suffer any significant distortion in phase. Inasmuch as the present invention requires a difference in phase between adjacent bit cells as a means of representing digital data, it is essential that the desired phases maintain a proper relationship with each other in accordance with the binary values they represent. Stated in another way, inasmuch as a binary 0 is represented by transitions, or zero crossings, at the bit cell boundaries and a binary 1 is represented by zero crossings at the bit cell boundaries plus an additional crossing at the midbit cell location, it is essential that these zero crossings be preserved in the recovery signal.

I have discovered that the zero crossings are preserved for a large number of random bit sequences. In certain "worst" case bit sequences, however, the waveform, when recovered, is seriously phased distorted, i.e., the zero crossings are phased-shifted or in some instances they are not even recoverable. One such typical "worst" case is a bit sequence in which a 1 is preceded and followed by one or more 0's. The 1 in this particular bit sequence is phase distorted to such an extent that two of its three zero crossings are lost in the recovered wave.

As will be demonstrated hereinafter, the absence of these two lost zero crossing in bit sequences such as 0-1-0, in accordance with my detection apparatus, does not alter the absolute value of the recovered data in that my decoder will emit a 0-1-0 output even when the zero crossings of the 1's digit are missing. However, in such an instance the first 0 in the sequence shares a portion of the 1's bit period and the 1's bit period extends over into and reduces the bit period of the last 0 digit. In some instances such as in telemetery operations wherein absolute digital values are of prime importance, the above-mentioned bit period distortion is not a serious handicap. In most computer operations, however, it is essential that each signal representing a binary digit maintain its proper bit cell duration. Furthermore, such precise bit cell durations are of importance for deriving a clock for those computer operations which require a clock along with the reproduced digital data. It should be understood, however, that in my invention data is recovered by self-timing and no such clock or external timing generator is required.

It was mentioned hereinbefore that a typical "worst" case condition for phase distortion in the recording system is represented by a 0-1-0 bit sequence. In this particular sequence, the high frequency signal for the 1 is phase distorted. This distortion is best understood by reference to the waveforms of FIG. 3A wherein an ideal waveform 180 at J is a split-phase-mark 0-0-1-0-0 bit sequence. Waveform 181 at K, FIG. 3A, depicts an actual waveform substantially as reproduced on a scope for the given bit sequence at a packing density of 10,000 bits per inch.

The original waveform 181 was viewed on a scope which was connected to the low-pass filter in the reproduce channel. The various limits of a hard-limit circuit employed in the reproduce channel are depicted along with waveform 181 so as to demonstrate that the 0 in the bit cell BC1 of the sequence, is above the threshold limit level of the limit circuit employed, and thus produces an appropriate square wave 185 after limiting as shown at L. The leading waveform during the first half of the next bit period BC2 is below the limit threshold level thus producing the desired transition at the boundary between BC1 and BC2. However, due to the phase distortion of the system, the waveform during the second half of BC2 fails to cross the threshold limit at the the midbit location and, thus, two zero crossings are lost. At L square wave 186 is developed although an undistorted wave would yield the desired signal including dashed lines 187. During the bit cell period BC3, the waveform 181 remains below the threshold limit level and crosses that limit substantially at the end of BC3 so as to establish the desired zero crossings which results in square wave 188 after limiting.

It was mentioned hereinbefore that in spite of this phase distortion distortion wherein two zero crossings for the 1 are lost, the decoder circuit nevertheless produces the proper bit sequence at its output even though the bit sequence is distorted from its assigned bit cell periods. Table I, described hereinbefore, may be employed in order to demonstrate the manner in which bit period delay yields the desired NRZ-C output.

Figures 3, 3A, 3B:
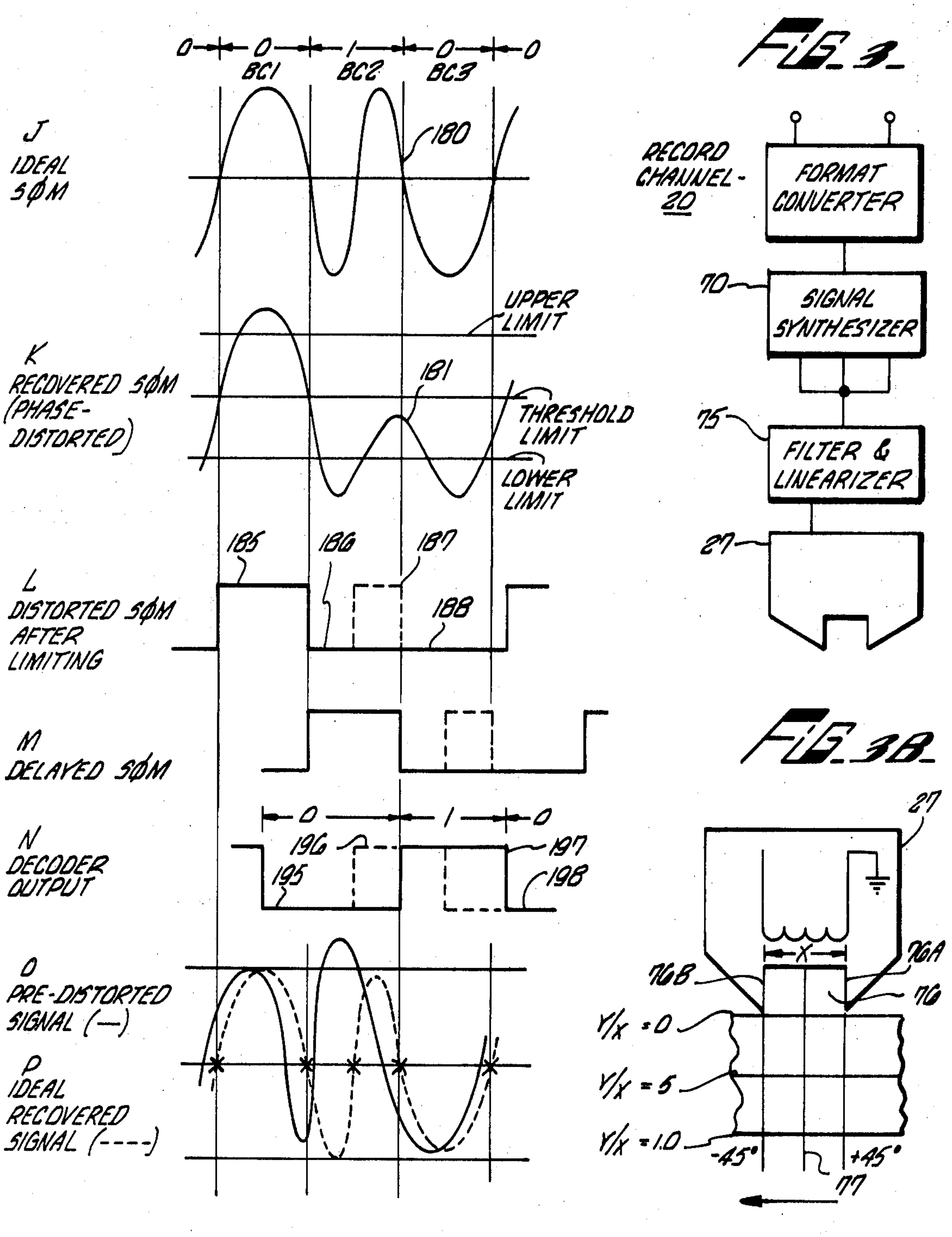
FIG. 3 is a combined block and circuit schematic diagram of a system having a signal synthesizer introduced between a format converter and a filter circuit in the record channel in accordance with the principles of this invention.
FIGS. 3A,3B, and 3C are of pulse and waveforms useful in promoting a clear understanding of FIG. 3.

Table I, discussed hereinbefore, may be applied in comparing the distorted and limited SφM signal at L, FIG. 3A, with the one-bit delayed version of itself at M, FIG. 3A. Thus, in accordance with Table I, during the second half of BC1, the recovered and delayed waveform L and M are opposite levels thus producing one portion of 0 output 195. During the first half of BC2, the waveforms are also opposite thus continuing a 0 output 195. In the ideal waveform as shown in dashed lines 196, the second half of BC should, in the absence of distortion, yield a 1 output as shown by the dashed lines.

During the entire duration of BC2 square wave 196 continues representing a 0. Then at the boundary between BC2 and BC3 waveforms L and M are at the same level and thus a 1 signal 197 is formed by the encoder. Signal 197 continued through the bit cell BC3 whereat it drops to a 0 level to from the last 0 signal 198 in the bit sequence. Although the sequence at N in solid lines is distorted from its assigned bit cell periods, it is correct from an absolute digital value standpoint.

Correction for phase distortion is easily provided in my invention by the apparatus generally illustrated by FIG. 3. Briefly, a record channel 20 includes a format converter as described hereinbefore for converting NRZ-C digital data to SφM digital data. Connected to the output of the format converter is a signal synthesizer circuit 70. This signal synthesizer 70 serves as a phase and amplitude predistortion circuit in that the split-phase-mark signal is purposely distorted from an ideal waveform to a waveform which will approach the ideal wavefrom after it has been filtered, recorded, on the magnetic medium and recovered. Connected to the output of the synthesizer circuit 70 is a filter 33, FIG. 4, and a bias oscillator and record head 27, operating in the manner discussed hereinbefore.

There are several major factors which contribute to the aforementioned phase distortion. These factors include high frequency distortion at the so-called "corner" edge of the low-pass filters. Thus, the frequencies in the signal being filtered which fall in the frequency ranges at the corner frequency are phase distorted by the filter. Another major factor contributing to phase distortion is associated with the recording and reproduce heads. Each such head has inherent distributed capacitance which capacitance, in conjunction with other circuit parameters, result in a resonant-tuned circuit at a frequency range which is peculiar to the particular heads being employed. It is thus advisable to control head design in such a manner that the head's resonance is at least one octave higher than the highest frequency to be recorded or reproduced. Even when this technique is employed, however, there is still some phase distortion introduced into the system by the resonance of the record and reproduce heads.

I have discovered that there is a further significant cause of phase distortion in a magnetic medium record and reproduce system and this other significant cause is phase distortion introduced in the signal location energy in the particles of magnetic medium itself.

The phase distortion introduced into the system by the magnetic medium itself is a function of the thickness of the magnetic surface receiving the wave to be recorded. Most magnetic heads employed today are of the ring type wherein a fine precision gap is present in the ring for contact or near contact with the magnetic medium. In FIG. 3B the record head 27 is depicted with an exaggerated gap 76. This gap 76 has a width dimension indicated as X. Adjacent to gap 76 is a highly exaggerated magnetic surface 30 which is depicted as having a thickness Y. The cross section of the magnified magnetic surface 30 includes a horizontal line at its midpoint which represents a ratio of Y/X equal to 0.5. The ratio of Y to X at the top surface of the magnetic medium is presumed to be the contact with the record head 27 and thus is substantially 0. The outermost surface of the magnetic medium 30 is typically the boundary between some magnetic material such as ferrous or chrome oxide and a nonmagnetic binder layer between that magnetic material and the main flexible surfaces of the tape body. This outer surface has a ratio Y to X which is equal to 1.

C.D. Mee in his Volume II entitled "The Physics of Magnetic Recording" at pages 38 through 43, describes a phenomenon that indicates that there is a significant change in recording field magnitude and direction as tape is passed across the recording gap in a ring-type head such as head 27. I have discovered that in addition to this significant change in field there is a significant change in phase of the signal recorded as energy in particles of the magnetic surface layer.

Movement of the magnetic medium in the direction indicated in FIG. 3B by the arrow is through a recording field at the gap 76 which rotates from a +45° at leading edge 76A to −45° at trailing edge 76B. The phase of signals being recorded tends to follow this field rotation, and thus storage of energy is in magnetic particles that are shifted to points other than the center line 77. This factor contributes to phase distortion of the type depicted at K in FIG. 3A.

Figures 3C, 4:
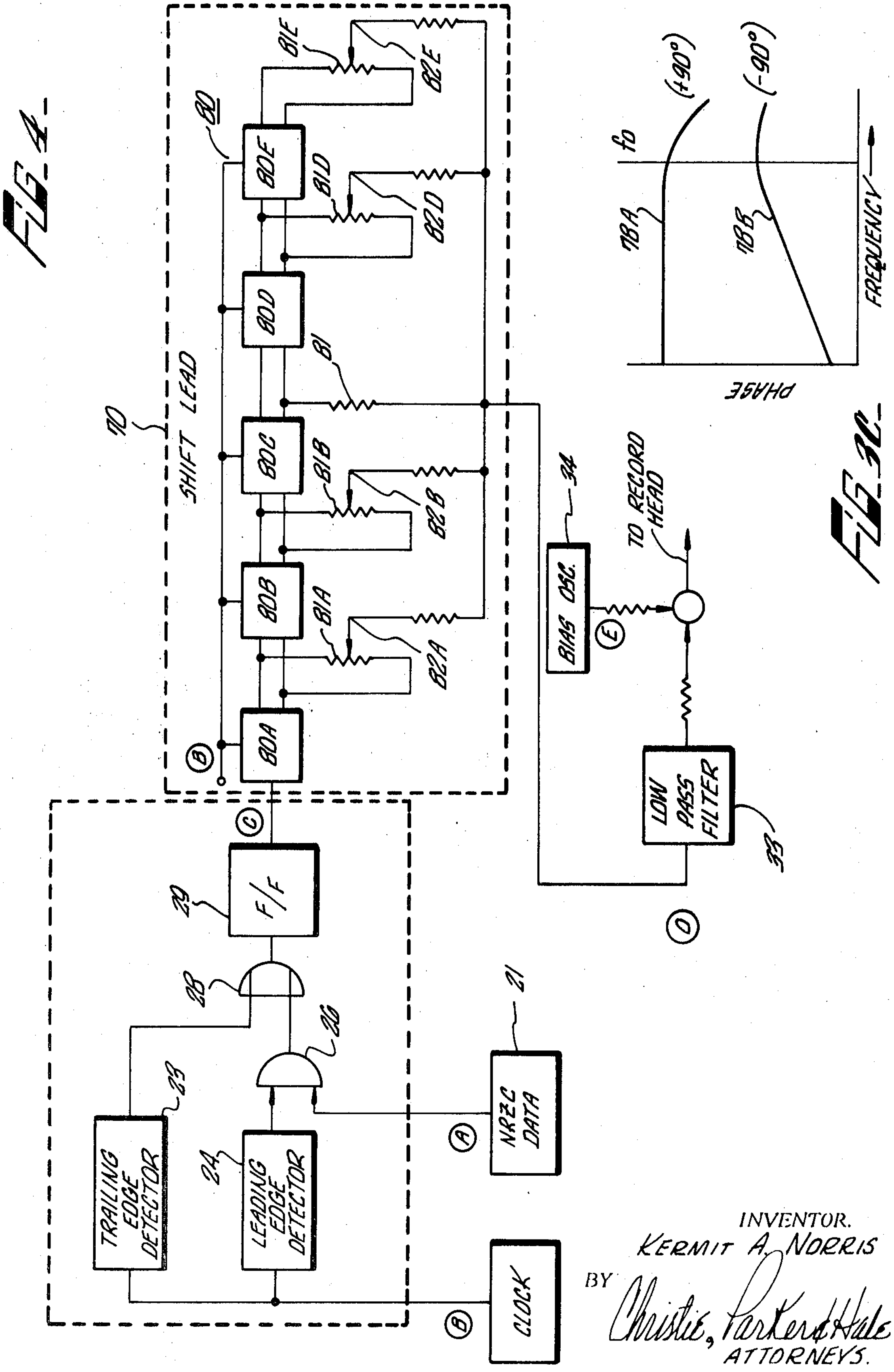
FIG. 4 is a combined block diagram and circuit schematic of FIG. 3.

FIG. 3C shows a plot of phase against frequency with frequency $f_0$ being the frequency at which the tape thickness is substantially equal to the wavelength at $f_0$. The phase distortion at frequencies higher than $f_0$ is 90° due to the thickness loss in the tapes recording thickness Such thickness losses are due primarily to self-demagnetization when the recorded wavelength is in the order of, or less than, the thickness of the magnetic coating, and can be expressed mathematically:

$$\text{Thickness loss } A_t=\frac{\lambda}{2\pi c}\left(1-e^{-\frac{2\pi c}{\lambda}}\right)$$

where λ is the wavelength and $c$ the coating thickness. The remanence in the coating is determined by the trailing edge 76B of the recording field, which has both a longitudinal and a perpendicular component. For long wavelengths the demagnetization is insignificant for the longitudinal remanence but almost unity for the perpendicular component. For decreasing wavelengths, the demagnetization factor increases for the longitudinal component and when λ equals 2 π times the thickness $c$, it is approximately 0.5, causing a 3 db. loss in the outer flux. The perpendicular component becomes more effective and will be the dominating remanence for shorter wavelengths associated with +90° phase shift, as shown by curve 78A in FIG. 3C. The remanence will further concentrate in the surface of the coating and the outer flux will decrease 6 db. per octave.

During playback the flux is differentiated and a linear phase is obtained at low frequencies until a −90° shift is experience as shown by reproduce curve 78B in FIG. 3C.

In accordance with my invention, such phase distortion is readily compensated for by utilizing a transversal filter in the system loop which is defined as including record and reproduce channels 20, 50 and the magnetic medium 30. In FIG. 4, the transversal filter 70 is shown as a prerecord signal synthesizer circuit connected between the output of a format converter and the input to a low-pass filter 33.

Transversal filters are, of course, well known and have been described in various publications as capable of selective adjustment of tap weight either manually or automatically. These tap weights are delayed outputs as associated with a multitap delay line for analog signals depicted, for example, in FIG. 5. In FIG. 4 an alternative type of transversal filter for digital signals is shown. The filter of FIG. 4 employs a five-stage shift register 80, shifted under control of the clock signal B, FIG. 2A. Since clock signal B is twice the frequency of the bit rate, each state 80A through 80E stores, at any one time, one-half of the signal level present in a given bit cell period of the information data train supplied to the filter 70.

Stage 80C is a center stage and has connected to its output a main tap 81. This center tap 81 is the primary and controlling factor in determining the output signal. The total output signal includes all of the signals present in all stages of the shift register as summed together through the other taps 81A, 81B, 81D and 81E. These taps 81A through 81D each include a resistive component connected in parallel between the 1 and 0 output levels for each of the stages 80A, 80B, 80D and 80E, respectively. Associated with each resistive component of stages 80A, 80B, 80D and 80E is an adjustable tap arm 82A, 82B, 82D and 82E, respectively.

Connected in this manner, use of a transversal filter is advantageous in that an operator may adjust each tap arm setting until the response of the transversal filter as indicated by visual observation on an oscilloscope connected to the output filter 53, FIG. 2, in the reproduce channel 50, is such that a wave near an ideal wave such as P, FIG. 3A is being recovered.

For instance, in FIG. 3, waveform O shown in solid lines represents a predistorted signal which may readily be obtained by selective adjustment of the tap arms of the transversal filter. This selective adjustment produces an output waveform to be recorded on the magnetic tap substantially as that shown at O once it has been filtered. This waveform O is depicted in a time domain whereas, it should be understood that the transversal filter selectively introduces Fourier sine frequency components such that any desired phase and/or amplitude response that can be described with a Fourier sine series is obtainable. Waveform O is a composite wave obtained from digital levels of a primary digital output (i.e., essentially a first harmonic) from stage 80C with its associated "echoes" (i.e., essentially lower order harmonics) as weighted by tap arm settings for stages 80A, 80B, 80D and 80E. After filtering, the primary digital signal and its "echoes" will substantially represent the predistorted waveform O, FIG. 3A.

Accordingly, after the signal has been recorded on the magnetic medium and subjected to the various factors of phase distortion discussed hereinbefore, including the phenomenon described in conjunction with FIGS. 3B and 3C, the recovered and filtered waveform will closely match the ideal recovered signal shown in dashed lines in waveform P, FIG. 3A. As is indicated in waveform P, each desired zero crossing is preserved and these zeros crossings after hard-limiting will deliver a precise square wave split-phase-mark signal for delivery to my novel differential phase-shift keying decoder 55.

The combination of the foregoing techniques have allowed applicant's invention to record 10,000 bits per inch with an error rate of one error in over $10^9$ bits of information, which is a significant advance over all known prior art.

The subject invention has been described with reference to certain preferred embodiments; it will be understood by those skilled in the art to which this invention pertains that the scope and spirit of the appended claims should not necessarily be limited to the embodiments described.

I claim:

1. In a magnetic memory system, a record channel, a reproduce channel, and a magnetic medium, the combination of which introduces phase distortion to selected frequencies within the frequency spectrum of signals to be handled by said system, said system being adapted to record on a magnetic storage medium data represented by two discrete levels forming two binary values wherein one binary value has a first level pattern in a bit cell and the other binary value has a second level pattern in a bit cell, said system comprising:

data means for receiving said data represented by said two discrete levels;

means for receiving a timing signal defining data bit cells of a predetermined duration;

phase-modulating means for phase modulating said data represented by two discrete levels with said timing signal for developing a continuous alternating current signal having either said first level pattern or said second level pattern occurring within each bit cell;

recording means for recording said continuous alternating current signal, which includes said first and second level patterns, as a nonsaturating signal in the form of a continuous flux variation on a magnetic medium;

means for reproducing the continuous flux variation as a continuous alternating current signal; and phase distortion compensating means in said system for introducing therein selected phase-shifted frequencies which, when summed with said alternating current signal, compensates for said phase distortion.

2. A system in accordance with claim 1 wherein said phase distortion compensating means comprises:

storing means for storing a predetermined portion of a binary value-indicating signal and deriving therefrom a fundamental and a plurality of harmonics;

means phase shifting selected ones of said derived signals by amounts and directions to compensate for said phase distortion when summed with said fundamental; and means for summing said fundamental and said phase-shifted harmonics.

3. A system in accordance with claim 2 wherein said phase distortion-compensating means comprises:

an analog signal transversal filter connected to said recording means said transversal filter including a tapped delay line as said storing means, said tapped delay including a center delay section having a first tap for deriving said fundamental, and complementary tap pairs associated with equally spaced delay times before and after said center delay section for deriving said harmonics; and means for selectively adjusting said taps to phase and amplitude shift said harmonics.

4. A system in accordance with claim 2 wherein said continuous alternating signal emitted by said phase-modulating means is substantially a square-wave including at least two digital levels, and wherein said phase distortion compensating means comprises a digital signal transversal filter connected between said phase-modulating means and said recording means.

5. A system in accordance with claim 4 wherein said digital signal transversal filter comprises as said storage means a plural-stage shift register having a center stage and at least a pair of complementary stages series-connected before and after said center stage;

means for shifting at least a portion of one data-indicating cycle through said plural stages;

said shift register including selectively adjustable tap means for emitting a fundamental and selectively phase-shifted harmonics; and signal-summing means connected to said taps for summing said fundamental and phase-shifted harmonics as a predistorted signal for delivery to said recording means.

6. A system in accordance with claim 5 wherein said shifting means includes a shift lead connected to said timing signal receiving means and said shift register stages each stores one-half of a data-indicating cycle.

7. A system in accordance with claim 4 wherein:

said timing signal is substantially a square-wave signal having a leading edge at the center of a bit cell and a trailing edge at the bit cell boundaries;

said digital data of one binary value is a first signal level for a bit cell duration; and for said other binary value is a second signal level for a bit cell duration.

8. A system in accordance with claim 7 wherein said modulating means comprises:

a leading and a trailing edge detector connected to said timing signal-receiving means for emitting an output signal respectively for each leading and trailing edge detected thereby;

a logical AND gate with one input connected to receive the output signals from said leading edge detector, and another input connected to said data means, said AND gate responsive to coincidence of one data level and an output signal from said leading edge detector for emitting a trigger signal;

a bistable multivibrator; and an OR gate with inputs connected to said AND gate and to said trailing edge detector, and with an output connected to said multivibrator to switch it back and forth between its two states in response to a trigger signal received from said AND gate or in response to an output signal from said trailing edge detector.

9. A system in accordance with claim 8 wherein said multivibrator emits said continuous alternating current signal as said substantially square-wave signal including at least two digital levels and said means for recording includes filtering means for smoothing said square-wave output from said multivibrator into substantially a phase-modulated sine wave for application to said magnetic medium.

10. A system in accordance with claim 4 and further comprising in said reproduce channel phase-detecting means coupled to said signal-reproducing means for emitting output signals representing said one binary value for said half-cycle wave recovered thereby and said other binary value for said full cycle wave recovered thereby.

11. A system in accordance with claim 10, wherein said phase-detecting means comprises:

means for delaying the signal from said reproducing means by at least one bit cell duration and phase comparison means connected to said delay and to said reproducing means, and including means responsive only to the reproduced and delayed signals for restoring the data to its original binary value content.

12. A system in accordance with claim 11 wherein said phase comparison means comprises an exclusive NOR gate.

13. A system in accordance with claim 11 wherein said phase comparison means comprises a phase-difference-keyed demodulator.

14. A method of recording and recovering high bit density in a magnetic memory system including a magnetic medium, and a record and reproduce channel which exhibits phase distortions to frequencies within the signal to be recorded and reproduced, comprising the steps of:

modulating a constant frequency signal with a test pattern of two different binary data levels so as to represent one data level in the modulated signal as a transition from one level to the other at midbit with additional transitions at the bit cell boundaries and representing the other data level as transitions at the bit cell boundaries only;

applying the modulated signals to a magnetic medium at an amplitude less than a saturation amplitude for the magnetic medium;

recovering the modulated signals from the magnetic medium;

displaying the recovered signals on a display which includes a reference axis that is not traversed by signals in the test pattern that have suffered phase shifts degrading said transitions; and inserting in either said record or said reproduce channel selected frequency components until said transitions for the phase-distorted signals traverse the reference axis substantially at their assigned bit cell locations.

15. A method of recording and recovering high bit density in a magnetic memory system including a magnetic medium, and a record and reproduce channel which introduces phase distortions to selected frequencies within the signal to be recorded and reproduced, comprising the steps of:

modulating a constant frequency signal with a test pattern of two different binary data levels so as to represent one data level in a modulated signal as a transition from one level to the other at midbit time of a bit cell boundaries, and representing the other data level as transitions at the bit cell boundaries only;

applying the modulated signal to a magnetic medium at an amplitude less than a saturation amplitude for the magnetic medium;

recovering the modulated signals from the magnetic medium;

displaying the recovered signals on a display which includes a reference axis which is traversed at assigned bit cell locations for the binary data level represented by nondistorted signals, and which is not traversed at assigned bit cell locations by data-representing signals in the test pattern that have suffered phase distortion; and inserting in either said record or said reproduce channel selected frequency components until said transitions for the phase-distorted signals traverse the reference axis substantially at their assigned bit cell locations for the binary data level they represent.

16. A method in accordance with claim 15 and further comprising the additional steps of:

delaying the restored data-modulated signal by at least one bit cell duration, or a multiple thereof;

comparing only the phase of the restored signal with the phase of the delayed signal; and representing phase similarities as one data level and phase variations as the other data level.

17. In a method of high bit density recording of binary data represented by a plurality of discrete binary value signal levels in a magnetic memory system including a magnetic medium, a record and a reproduce channel which introduces phase distortion to selected frequencies within signals to be recorded and reproduced by the system, the steps comprising:

representing each data bit cell by at least one cycle of a substantially square-wave carrier clock signal including level transitions at the beginning, middle, and end of each bit cell;

phase modulating the carrier clock signal with the discrete binary value signal levels to produce a substantially square-wave signal containing the discrete binary value levels as phase differences between adjacent bit cells;

filtering the data containing square wave of step two to a corresponding phase-modulated analogue signal which includes frequency components which are phase-distorted by said memory system;

applying the data-modulated carrier signal as a continuous nonsaturated flux variation on a magnetic medium;

recovering the flux variations and reproducing the nondistorted and distorted signals;

selectively introducing frequency components into said system to compensate for the phase distortions; and decoding the phase-compensated data-modulated carrier with itself delayed by an integral whole number bit cell interval by emitting one binary data level when the compared phases are the same and emitting another binary data level when the compared phases are different.

18. A high bit density magnetic memory system having a magnetic medium, a record channel including a record head, a reproduce channel including a reproduce head and means for controllably establishing relative movement between the magnetic medium and said heads, said system being characterized by nonlinearity of selected high frequencies, which nonlinearity introduces phase distortions into selected frequency components of signals being processed by said system; said system comprising:

means for receiving binary bit signals represented by discrete data levels;

means for receiving a timing signal repetitively traversing a reference axis with at least 1 cycle for each bit cell as defined by transitions of said reference axis substantially at the bit cell boundaries;

means for repetitively detecting one particular transition of the timing signal and establishing a corresponding transition to serve as a timing reference in a bilevel split-phase output signal;

means for repetitively detecting another transition of the timing signal, including means for comparing the detected other transition with the discrete data levels and establishing in said split-phase output signal one binary value in a given phase relative to said timing reference and the other binary value as a different phase relative to said timing reference;

means for recording the split-phase signal on a magnetic medium as nonsaturated flux variations in the medium;

means for reproducing the nonsaturated flux variations in the medium as a signal distorted in phase relative to the phases in the signal recorded on said medium; and means for selectively introducing frequency components into said system to phase compensate for said phase distortions.